United States Patent

[11] 3,589,686

[72] Inventor Thomas O. Russell, Jr.
Fullerton, Calif.
[21] Appl. No. 19,863
[22] Filed Mar. 16, 1970
[45] Patented June 29, 1971
[73] Assignee The Susquehanna Corporation
Fairfax County, Va.

[54] AGGREGATE TREATMENT PROCESS AND APPARATUS
15 Claims, 1 Drawing Fig.

[52] U.S. Cl. ................................................. 259/148,
259/DIG. 44
[51] Int. Cl. ............................................... B28c 7/00
[50] Field of Search ................................ 259/146,
147, 148, 149, 151, 153, 154, 164, 168, 18, 19

[56] References Cited
UNITED STATES PATENTS

| Re. 26,545 | 3/1969 | Albert | 259/147 |
| 886,768 | 5/1908 | Bogory | 259/148 |
| 1,703,864 | 3/1929 | Arnold | 259/146 |
| 3,326,535 | 6/1967 | Clercx | 259/147 |
| 3,338,563 | 8/1967 | Leling | 259/146 |

Primary Examiner—Robert W. Jenkins
Attorney—Martha L. Ross

ABSTRACT: The process is directed to the vacuum-saturation of porous lightweight aggregate in which a high vacuum is first drawn on the aggregate to evacuate the aggregate voids, and then the aggregate is flooded with water to fill the evacuated voids and thereby saturate the aggregate. The desired vacuum level is preset, and no water can enter the saturation chamber until this level is reached. Also, if the vacuum drops below this level while water is being admitted, the process is stopped until the vacuum level is again attained.

PATENTED JUN 29 1971 3,589,686
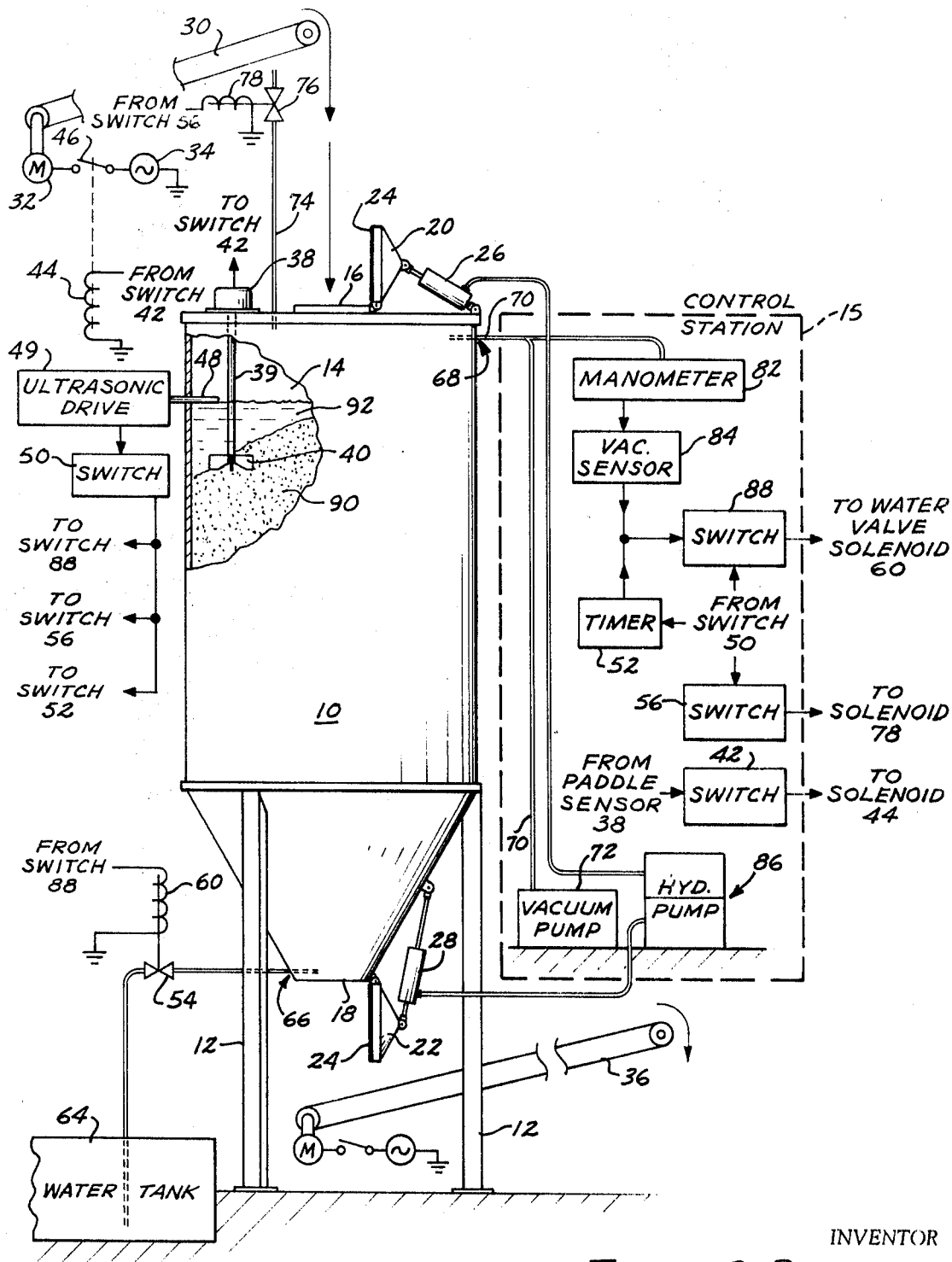
INVENTOR
THOMAS O. RUSSELL, JR.
BY Tipton D. Juning
ATTORNEY

AGGREGATE TREATMENT PROCESS AND APPARATUS

BACKGROUND OF THE INVENTION

1. FIELD OF THE INVENTION

The present invention is directed to a process and apparatus for treating aggregate and, more particularly, to a vacuum-saturation process and apparatus for saturating porous, lightweight aggregate.

2. Description of the Prior Art

In U.S. Pat. Re. No. 26,545, reissued Mar. 11, 1969, to R. J. Albert there is disclosed a method for treating porous lightweight aggregate in which the aggregate is subjected to a vacuum within a closed cylinder and then saturated by water admitted into the cylinder while the vacuum is maintained. Afterwards, when this treated aggregate is incorporated into a concrete mix, the mix is stable under pressure and, therefore, pumpable. This result is attainable because the voids of the aggregate are filled with water which prevents entry of the cement paste and mix water under the pressures normally encountered during pumping.

Vacuum-saturation processes for lightweight, porous aggregates are now being adopted on a commercial scale. The cost for processing saturated aggregate must be kept low if the aggregate is to be acceptable to the cost-conscious and highly competitive building industry. However, this concern for cost must not affect the pumpability of the concrete mix once it incorporates this processed aggregate.

The apparatus disclosed in the aforementioned Albert patent is primarily of the laboratory type and was used in performing experiments to support his patent. Obviously, the limitations of such apparatus make it entirely unsuitable for commercial operations. Therefore, the need is for apparatus which will commercially vacuum-saturate porous, lightweight aggregate in an efficient manner, yet provide consistent results from batch to batch.

SUMMARY

Briefly, the present invention is directed to a process and apparatus for the vacuum-saturation of porous, lightweight aggregate. The aggregate is placed within an airtight chamber and a vacuum drawn to evacuate air from the voids of the aggregate particles. Next, a saturation liquid, such as water, is admitted into the chamber, while the vacuum is being maintained, to fill these voids and thereby saturate the aggregate. Should the vacuum in the chamber drop below a preset level during admission of the liquid, this drop in vacuum is sensed and further admission of liquid is terminated.

Accordingly, it is an object of the present invention to provide an improved apparatus and process for the vacuum-saturation of porous, lightweight aggregate.

A second object of the present invention is to provide such an apparatus and process on a commercial scale which ensure repeatable characteristics in the saturated end product.

Another object of the present invention is to provide such an apparatus and process which preferably function on an automatic or a closely controlled basis to give an end product which consistently has the same characteristics from batch to batch.

A further object of the present invention is to provide such an apparatus and process which operate in an efficient manner to give a highly satisfactory saturated end product which is competitive within the construction industry.

Still another object of the present invention is to provide such an apparatus and process in which the conditions under which the aggregate is saturated are closely controlled to provide a fully saturated end product.

Other objects and advantages will become apparent from a reading of the following detailed description in conjunction with the accompanying drawing.

BRIEF DESCRIPTION OF THE DRAWING

The sole FIGURE is a partially sectional view of a vacuum-saturation system constructed and operated in accordance with the present invention.

DESCRIPTION OF THE PREFERRED EMBODIMENT

Turning now to a detailed description of the invention, there is shown in the FIGURE a vacuum-saturation system in which reference character 10 designates a vessel or tank, cylindrical throughout the major part of its height and having a cone-shaped bottom that serves additionally as a discharge hopper. Tank 10 is elevated from the ground by means of supports 12, and has an enclosed chamber 14 in which the vacuum-saturation of aggregate is carried out.

A control station 15 located preferably nearby tank 10 provides a central point from which control or supervision of the process steps are effected.

At the top and bottom respectively, of tank 10 are located the loading hatch 16 and unloading or discharge hatch 18. The covers for these hatches are pivotally connected to the tank and are respectively designated by reference characters 20 and 22. Each hatch cover has a rubber grommet or seal 24 on its face so that when closed upon its hatch, an airtight and watertight seal is effected. Connected to hatch cover 20 is a hydraulic piston 26 to assist in the opening and closing of hatch 16. Similarly, at hatch 18 is a second hydraulic piston 28 connected to cover 22.

A loading or charging conveyor 30 is positioned to carry dry, lightweight, porous aggregate to a point above hatch 16 and there let it fall into tank 10 to fill chamber 14. The loading conveyor is driven by a conventional arrangement of a motor 32 powered by an AC supply 34. Positioned beneath the bottom hatch 18 is a discharge conveyor 36 for carrying the treated aggregate away from tank 10 as it is dumped from chamber 14. The aggregate, upon reaching the end of the conveyor 36, can be stockpiled or loaded into trucks or trains (not shown). Conveyor 36 is also driven by conventional motor arrangement.

Mounted on the top of tank 10 is a housing 38 having a shaft 39 which extends through the tank 10 into the chamber 14. A paddle 40 is connected to the outer end of the shaft. A drive motor and switch means (not shown) are positioned within the housing 38. The paddle 40 is normally rotated at a slow rate and is sensitive to any rotation resistance greater than a preset amount. If such rotation resistance is exceeded, switch contacts (not shown) within housing 38 will close. These switch contacts are electrically connected to switch 42 in the control station which in turn is connected to solenoid 44. Solenoid 44 is mechanically connected to contact 46 which lies in the electrical path between motor 32 and AC source 34. The paddle sensor is used to control the level of aggregate loaded into chamber 14. Such paddle sensors with motor and switch means are conventional in construction and commercially available from Monitor Manufacturing, Inc., Batavia, Illinois, and are known there by the trademark Bin-O-Matic bin level control.

The water level control comprises a probe 48, an ultrasonic energizing means 49, and a sensing switch represented by character 50. The probe 48 is mounted to extend through the wall of tank 10 into chamber 14. This probe has an ultrasonically energized face whose motion is damped when water contacts it. The switch within block 50 is responsive to the vibration of probe 48 and is actuated when the probe becomes damped. Switch 50 is electrically connected to timer 52, switch 88, and switch 56 in the control station 15. The water level control shown here is conventional in construction and can be obtained commercially under the trademark of Sonac compact liquid level control which is manufactured by the Delavan Manufacturing Co., West Des Moines, Iowa.

Connected at port 68 formed in the wall of tank 10 is a vacuum line 70 which opens at one end into chamber 14. At its other end, vacuum line 70 is attached to vacuum pump 72 in control station 15. Connected into vacuum line 70 is a conventional manometer 82 for indicating the vacuum level within tank 10. Electrically connected to manometer 82 is an automatic vacuum-sensing switch 84 which detects when the manometer reading reaches a point indicative of the preset vacuum level desired in chamber 14. The output of switch 84 is connected to switch 88. The vacuum-sensing switch 84 is of conventional design and is commercially available from the Merriam Instrument Co., Cleveland, Ohio. A switch model which has been found to perform satisfactorily in practice is their Manotac model 70AA12-1.

A water valve 54 is positioned in waterline 62 which extends from water tank 64 to tank 10. Line 62 is in communication with chamber 14 via port 66 formed at the bottom of tank 10. The operation of valve 54 is controlled by water valve solenoid 60. Switch 88 controls solenoid 60 to admit and drain water to and from tank 10 as explained hereinafter.

Any vacuum formed within chamber 14 can be released through a vacuum release line 74. A valve 76 which is controlled by solenoid 78 is located in this line. Hydraulic pistons 26 and 28 are connected to be operated by a conventional hydraulic pump 86 installed in the control station 15.

Before operation begins, hatches 16 and 18 are open, water valve 54 is closed, contact 46 in the control line of conveyor 30 is open, conveyor 36 is stationary, vacuum pump 72 is idle, vacuum release valve 76 is closed, and the various control switches are in an inactive or reset condition. Paddle 40 is rotating within chamber 14, and water level control probe 48 is energized.

The hydraulic pump 86 is first manually actuated to act upon hydraulic piston 28 and thereby close cover 22 tightly against hatch 18. Next, contact 46 is closed and motor 32 is energized to run the loading conveyor 30. Dry aggregate is now loaded into chamber 14. This aggregate is designated by reference character 90.

As the aggregate is loaded into chamber 14, it eventually reaches the preset level where it contacts rotating paddle 40. The paddle 40 and shaft 39 now encounter sufficient resistance to rotation to operate the switch (not shown) in housing 38. Switch 42 in control station 15 becomes activated to energize solenoid 44. Contact 46 opens to stop motor 32 and thereby conveyor 30. Hydraulic pump 86 is again manually operated, this time to actuate piston 26 to close cover 20 upon the top hatch 16. The chamber 14 is now sealed, and the vacuum pump 72 is turned on to pull a vacuum through line 70 upon the dry aggregate within the chamber.

When the predetermined vacuum has been reached within chamber 14 and therefore at manometer 82, it is detected by vacuum-sensing switch 84. This sensing switch in turn actuates switch 88, which sends out a control signal to operate water valve solenoid 60. Valve 54 opens and the vacuum in chamber 14 draws in water from tank 64. As the water level rises in chamber 14, the evacuated voids in each aggregate particle are filled as each particle is inundated by the water. The high vacuum within chamber 14 is maintained to at least the predetermined vacuum level during this saturation step by the continued operation of vacuum pump 72. Eventually water covers all of the aggregate, as depicted by character 92 in the FIGURE, and the water level reaches the level of probe 48. When the water contacts the face of probe 48, switch 50 operates to deactivate switch 88. The control signal is removed from solenoid 60 and valve 54 closes, thereby stopping further flow of water into chamber 14.

At this same time, switch 50 also operates switch 56. This latter switch now sends a control signal to operate solenoid 78 and open vacuum release valve 76. The vacuum within chamber 14 is released through line 74, and the chamber pressure rises to atmospheric. The application of full atmospheric pressure to the water in chamber 14 forces additional water into any unfilled voids of the aggregate particles to make saturation more complete.

At this same time, switch 50 additionally energizes timer 52. After a brief delay interval, e.g. 90 seconds, as may be sufficient to permit the full effect of the application of atmospheric pressure, timer 52 actuates switch 88. A control signal is again sent out to operate water valve solenoid 60. Valve 54 now opens, and the free or excess water in chamber 14 drains back into tank 64. However, the water in the voids of the aggregate does not escape as the water level drops but remains trapped within the voids to hold the aggregate in a saturated state.

When all of the excess water has drained into water tank 64, hydraulic pump 86 is now operated to cause piston 28 to open hatch cover 22. At this time, the unloading conveyor 36 is turned on to carry away the saturated aggregate as it falls out of tank 10. The processing cycle is now complete. If desired, a new batch of dry aggregate can now be processed in tank 10.

The result sought for each batch of aggregate processed in tank 10 is to provide aggregate which is saturated to such an extent that it can be combined into a concrete mix and pumped satisfactorily under the pressures normally encountered during pumping. Should the vacuum be lost during processing or drop below what is considered a minimum level, then the aggregate will not be sufficiently saturated, and the resulting concrete mix will not have the desired pumping characteristics. In such case, the voids of the aggregate will not be filled with water, and during pumping the pressures encountered will drive the cement paste and mix water into these voids. The mix then stiffens and offers great resistance to pumping as well as undergoing a loss of slump. Also, air will be trapped within the voids and compressed when subjected to the high pumping pressures. As pressure is again reduced to atmospheric at the end of the pipe through which the mix is being pumped, the entrapped compressed air within the aggregate returns to its original uncompressed volume. This action forces water back out of the aggregate and washes the cement paste from the surface of the aggregate, thus seriously weakening the interface bond.

In the operation of the process, therefore, it is imperative that the vacuum be maintained at a preset high level at all times during admission of water so that the aggregate will become sufficiently saturated to accommodate subsequently the high pumping pressures. It has been found in practice that a vacuum of at least 28 inches of mercury is preferred. In such case, over 90 percent of gas in the voids is evacuated and replaced with water, and the aggregate can be considered substantially completely saturated.

Therefore, as along as this vacuum level is met or exceeded, valve 54 will remain open during the saturation step and water will flow into chamber 14. The method by which valve 54 opens to initially admit water has been described above. If, while chamber 14 is being filled, there is a loss of vacuum below the preset level, it is indicated at manometer 82 and detected by vacuum-sensing switch 84. Switch 84 now deactivates switch 88 and solenoid 60 responds to close water valve 54. Valve 54 now remains closed until such time as the vacuum again reaches the preset level, at which time the water valve opening step again occurs. Thus, it is ensured that the aggregate in chamber 14 is saturated under the desired high-vacuum conditions.

Note that the sensor for the water level control is physically positioned above that for the aggregate level control and that both sensors are placed as shown in the FIGURE near the top of tank 10. This ensures that each batch is by volume as large as can be reasonably accommodated by the dimensions of tank 10, that all aggregate will be inundated and, therefore, saturated by the water, and that all saturation will occur as just described, under optimum vacuum conditions. Therefore, as batch after batch of aggregate is processed in tank 10, the aggregate volume, and the water volume, will remain substantially constant and at an optimum level, and the aggregate will emerge in a substantially completely saturated state ready for use in lightweight, pumpable concrete. This processing, therefore, lends itself to efficient use of the apparatus and a resultant product which is consistent in quality and quantity batch after batch.

The system described above has been depicted partially in a schematic fashion, while in practice the system has been designed to process automatically one batch of aggregate by depressing a single switch, thus avoiding intermediate manual steps. This fully automatic operation can, in view of the present teaching, readily be obtained by use of such conventional means as microswitches and other conventional switching means so that the completion of each step of the process can be used as the signal to begin the next step.

For example, rather than closing contact 46 manually, a microswitch is placed at hatch 18. When hatch cover 22 closes, this microswitch causes solenoid 44 to become energized, closing contact 46 and starting the loading conveyor 30. In a similar manner, when hatch 16 is closed a microswitch there can start the vacuum pump 72 to avoid the need for manual effort. Also, pump 72 can be turned off automatically when valve 76 is operated by switch 56. Thus, it is readily seen that a completely automatic process would be, in essence, the equivalent of what has been presently described; furthermore, it is now apparent that the same basic conceptual cooperation of structure and process steps, defined hereinabove with respect to the aforedescribed partially schematic system, is followed in commercial practice.

It is apparent that various modifications can be made by one skilled in the art without departing from the spirit and scope of the present invention; therefore, it is desired that only such limitations be placed on this invention as are imposed by the prior art and set forth in the appended claims.

What I claim is:

1. In a process for the vacuum-saturation of porous, lightweight aggregate in which the aggregate is placed within an airtight chamber, a vacuum drawn to at least a predetermined level and saturation liquid admitted into said chamber, the improvement comprising the step of automatically terminating further admission of saturation liquid into said chamber in response to a loss of vacuum below said predetermined vacuum level.

2. In a process as claimed in claim 1, the additional step of automatically admitting said saturation liquid into said chamber when the vacuum being drawn reaches said predetermined level.

3. In a process as claimed in claim 2 the additional steps of automatically sensing when the vacuum being drawn in said chamber reaches said predetermined level and admitting saturation liquid in response thereto, and automatically sensing any loss of vacuum in said chamber below said predetermined level and terminating further admission of saturation liquid in response thereto.

A process for the vacuum-saturation of porous, lightweight aggregate comprising the steps of loading said aggregate into a chamber, terminating the loading of said aggregate into said chamber once said aggregate has been loaded to a predetermined aggregate level, sealing said chamber, evacuating substantially all air from said chamber and thereby from the interior voids of the aggregate, thereafter admitting water into said chamber to saturate said aggregate by filling the evacuated voids with water, and automatically terminating the further admission of water into said chamber in response to either said water reaching a predetermined level above said predetermined aggregate level or a loss of vacuum within said chamber.

5. A process as claimed in claim 4 comprising the additional steps of releasing the vacuum from said chamber after the water has reached said predetermined level, and thereafter unloading the saturated aggregate from said chamber.

6. A process for the vacuum-saturation of porous, lightweight aggregate comprising the steps of loading said aggregate into a chamber, terminating the loading of said aggregate into said chamber once said aggregate has been loaded to a predetermined aggregate level, sealing said chamber, evacuating substantially all air from said chamber and thereby from the interior voids of the aggregate by the drawing of a vacuum to a predetermined vacuum level, thereafter admitting water into said chamber to saturate said aggregate by filling the evacuated voids with water, automatically terminating the further admission of water into said chamber in response to any drop in vacuum below said predetermined vacuum level, readmitting water into said chamber in response to an increase in vacuum back to said predetermined vacuum level, and automatically terminating the further admission of water into said chamber when said water rises to a predetermined water level above said aggregate level.

7. A process as claimed in claim 6 comprising the additional steps of releasing the vacuum from said chamber after the water reaches said predetermined water level thereby exposing the water to atmospheric pressure, draining the free water from said chamber and unloading the saturated aggregate from said chamber.

8. A process for the vacuum saturation of porous, lightweight aggregate comprising the steps of loading said aggregate into a chamber, automatically sensing when the aggregate being loaded into said chamber reaches a predetermined aggregate level and then terminating the further loading of aggregate, sealing said chamber, drawing a vacuum in said chamber to evacuate substantially all air therefrom and accordingly from the interior voids of said aggregate, automatically sensing when substantially all air has been withdrawn from said chamber by the rise in vacuum to a predetermined vacuum level and automatically admitting water into said chamber in response thereto, said water serving to saturate said aggregate by filling the evacuated voids with water, automatically sensing a drop in vacuum below said predetermined vacuum level during the admission of water into said chamber and automatically terminating the further admission of water into said chamber in response thereto, automatically sensing an increase in vacuum back to said predetermined vacuum level and automatically readmitting water into said chamber in response thereto, and automatically sensing the rise in water in said chamber to a predetermined water level above that of said aggregate level and automatically terminating further admission of water in response thereto.

9 A process as claimed in claim 8 comprising the additional steps of automatically releasing the vacuum from said chamber in response to said water reaching said predetermined water level to expose thereby the water to atmospheric pressure, draining after a preset period of time the free water from said chamber, and then unloading the saturated aggregate from said chamber.

10. Apparatus for use in the vacuum saturation of porous lightweight aggregate comprising a vessel having a chamber designed to receive a load of aggregate, means in communication with said chamber for drawing a vacuum therein, means for admitting water into said chamber to saturate aggregate therein, and means responsive to the vacuum level maintained within said chamber for controlling said admitting means and thereby the admission of water into said chamber.

11. Apparatus as claimed in claim 10 wherein said controlling means includes means for sensing the vacuum level within said chamber and actuating said admitting means to initiate admission of water into said chamber in response to said vacuum reaching a predetermined vacuum level, and deactivating said admitting means to terminate further admission of water into said chamber in response to a loss of vacuum below said predetermined level.

12. Apparatus as claimed in claim 11 further comprising means for sensing when water admitted into said chamber reaches a predetermined water level and deactuating said admitting means to automatically terminate further admission of water into said chamber in response thereto.

13. Apparatus as claimed in claim 12 further comprising means for loading aggregate into said chamber, means for sensing when the aggregate loaded into said chamber reaches a predetermined aggregate level and automatically terminating further loading of aggregate into said chamber in response thereto.

14. Apparatus as claimed in claim 13 further comprising a first hatch at the top of said vessel through which aggregate is loaded into said chamber, a second hatch at the bottom of said vessel through which saturated aggregate is unloaded, and a hatch cover for each hatch to close said hatches and thereby seal said chamber.

15. Apparatus as claimed in claim 14 further comprising means for releasing the vacuum from said chamber in response to said water reaching said predetermined water level to expose thereby the water to atmospheric pressure.